(12) United States Patent
Tsubata et al.

(10) Patent No.: US 10,132,627 B2
(45) Date of Patent: Nov. 20, 2018

(54) ELECTRONIC DEVICE, MEASUREMENT DATA PROCESSING METHOD, AND MEASUREMENT DATA PROCESSING PROGRAM

(71) Applicant: SEIKO INSTRUMENTS INC., Chiba-shi, Chiba (JP)

(72) Inventors: Keisuke Tsubata, Chiba (JP); Kazuo Kato, Chiba (JP); Tomohiro Ihashi, Chiba (JP); Takanori Hasegawa, Chiba (JP); Hisao Nakamura, Chiba (JP); Katsuya Mugishima, Chiba (JP); Akira Takakura, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 610 days.

(21) Appl. No.: 14/543,946

(22) Filed: Nov. 18, 2014

(65) Prior Publication Data

US 2015/0168142 A1 Jun. 18, 2015

(30) Foreign Application Priority Data

Dec. 17, 2013 (JP) ................................. 2013-260308

(51) Int. Cl.
| | |
|---|---|
| *G01C 5/00* | (2006.01) |
| *G01P 3/00* | (2006.01) |
| *G04G 5/00* | (2013.01) |
| *G01C 5/06* | (2006.01) |
| *G04G 21/02* | (2010.01) |
| *G04G 21/00* | (2010.01) |
| *G04R 20/02* | (2013.01) |

(52) U.S. Cl.
CPC ............ *G01C 5/06* (2013.01); *G04G 21/00* (2013.01); *G04G 21/02* (2013.01); *G04R 20/02* (2013.01)

(58) Field of Classification Search
CPC ............. G01C 5/06; G01P 3/62; A63B 24/00
See application file for complete search history.

(56) References Cited

U.S. PATENT DOCUMENTS

2011/0003665 A1* 1/2011 Burton .................. G04F 10/00
482/9

OTHER PUBLICATIONS

Patent Abstracts of Japan, Publication No. 06-050768, Publication Date Feb. 25, 1994.

* cited by examiner

*Primary Examiner* — Changhyun Yi
(74) *Attorney, Agent, or Firm* — Adams & Wilks

(57) ABSTRACT

An electronic device has a storage unit that stores unit information relating to movement with respect to each of an elevating state and a horizontal movement state and an altitude measurement unit that measures a series of altitudes. An altitude change determination unit determines whether the movement is the elevating state or not using a first determination section having a first altitude range based on a first set of altitudes within the measured series of altitudes, and determines whether the movement is the horizontal movement state or not using a second determination section having a second altitude range smaller than the first altitude range and based on a second set of altitudes within the measured series of altitudes. A movement distance calculator reads from the storage unit the unit information corresponding to the state determined by the determination unit and calculates a movement distance based on the read unit information.

16 Claims, 8 Drawing Sheets

ELECTRONIC DEVICE, MEASUREMENT DATA PROCESSING METHOD, AND MEASUREMENT DATA PROCESSING PROGRAM

BACKGROUND OF THE INVENTION

Field of the Invention

The present invention relates to an electronic device, a measurement data processing method, and a non-transitory computer-readable medium containing a measurement data processing program.

Background Art

In the related art, an electronic device that measures a pressure of an atmosphere (atmospheric pressure) and displays an altitude change based on a change of the measured atmospheric pressure has been used. The electronic device is used for exercise performed in a mountain place where undulations are noticeable, such as hiking or mountain climbing, and is applied for measurement of a movement amount or consumed energy due to the exercise, for example.

For example, in an exercise consumed energy measurement device disclosed in JP-A-6-50768, a vertical motion sensor configured by a pressure receiving element detects an atmospheric pressure change generated according to vertical displacement, detects a vertical movement amount of an object to be measured such as a human from a vertical difference between atmospheric pressure values, and calculates a vertical displacement amount from the detected output. When a user steps on a place having a different altitude from a reference position with the same stride, the exercise consumed energy measurement device measures the height from the reference place. Specifically, the exercise consumed energy measurement device assumes that the walking stride is constant to calculate the size of a horizontal component using the Pythagorean theorem.

However, in the exercise consumed energy measurement device disclosed in JP-A-6-50768, since landing of each stride is detected from the change amount of the atmospheric pressure, it is necessary to shorten a sampling interval of the atmospheric pressure detection, which increases the amount of power consumption and computation. Further, since the atmospheric pressure change for each stride is small, high resolution or reproducibility is demanded for the atmospheric pressure measurement. Thus, in the technique disclosed in JP-A-6-50768, a sensor having high accuracy is necessary, which increases the cost of the device.

SUMMARY OF THE INVENTION

Thus, in order to solve the above problems, an object of the invention is to provide an electronic device, a measurement data processing method, and a non-transitory computer-readable medium containing a measurement data processing program capable of calculating a movement distance using a simple computation and a small amount of power consumption without use of an altitude sensor having high accuracy.

According to an aspect of the invention, there is provided an electronic device including: a storage unit that stores unit information relating to a movement with respect to each of an elevating state and a horizontal movement state; an altitude measurement unit that measures an altitude; a determination unit that determines whether the movement is the elevating state or the horizontal movement state based on the altitude measured by the altitude measurement unit; and a movement distance calculator that reads the unit information corresponding to the state determined by the determination unit from the storage unit and calculates a movement distance based on the read unit information.

According to another aspect of the invention, the above-described electronic device further includes a timer that measures time, the storage unit stores a movement speed in the elevating state and a movement speed in the horizontal movement state, and the movement distance calculator reads the movement speed corresponding to the state determined by the determination unit from the storage unit and calculates the movement distance based on the read movement speed and the time measured by the timer.

According to still another aspect of the invention, in the above-described electronic device, when it is determined that the horizontal movement state is continued for a predetermined time, the determination unit determines that the state is a non-movement state where the movement is not performed.

According to still another aspect of the invention, in the above-described electronic device, when the determination unit determines that the state is the non-movement state, the movement distance calculator subtracts the movement distance according to the predetermined time to calculate the movement distance.

According to still another aspect of the invention, the above-described electronic device further includes: a manipulation input unit that receives a manipulation input; and a setting unit that sets the unit information in the storage unit based on the manipulation input received by the manipulation input unit.

According to still another aspect of the invention, the above-described electronic device further includes: a manipulation input unit that receives a manipulation input; and a setting unit that sets the predetermined time in the storage unit based on the manipulation input received by the manipulation input unit.

According to still another aspect of the invention, there is provided a measurement data processing method in an electronic device, including: determining whether a movement is an elevating state or a horizontal movement state based on an altitude measured by an altitude measurement unit that measures the altitude; and reading, from a storage unit that stores unit information relating to the movement with respect to each of the elevating state and the horizontal movement state, the unit information corresponding to the determined state, and calculating a movement distance based on the read unit information.

According to still another aspect of the invention, there is provided a non-transitory computer-readable medium containing a measurement data processing program that causes a computer as an electronic device to execute a procedure including: determining whether a movement is an elevating state or a horizontal movement state based on an altitude measured by an altitude measurement unit that measures the altitude; and reading, from a storage unit that stores unit information relating to the movement with respect to each of the elevating state and the horizontal movement state, the unit information corresponding to the determined state, and calculating a movement distance based on the read unit information.

According to the invention, the unit information relating to the movement is stored in advance with respect to each of the elevating state and the horizontal movement state. Further, the state of the movement is determined based on the altitude, and the movement distance is calculated based on unit information corresponding to the determined state.

Thus, the movement distance can be calculated with a simple computation and a small amount of power consumption without using an altitude sensor having high accuracy. Accordingly, it is possible to prevent an increase in the device cost.

DETAILED DESCRIPTION OF THE INVENTION

Figure 1:
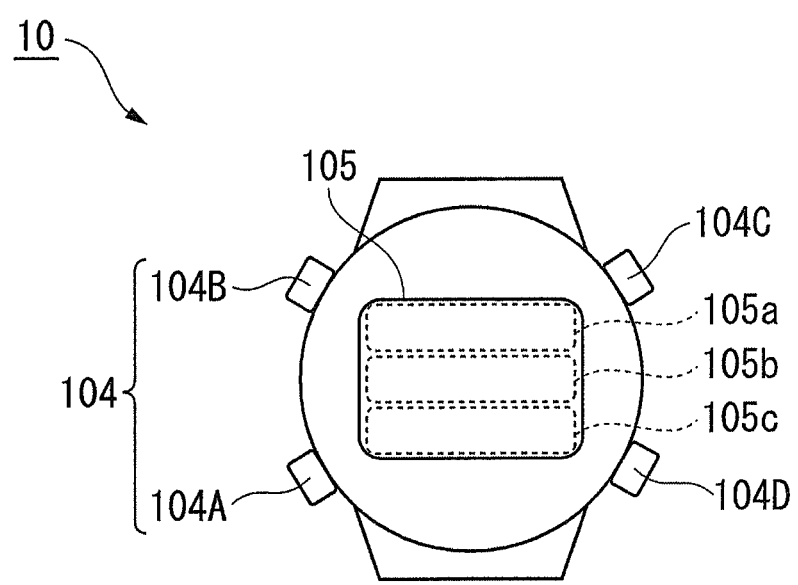
FIG. 1 is a front view illustrating an appearance configuration of an electronic device according to a first embodiment of the invention.

Hereinafter, embodiments of the invention will be described with reference to the accompanying drawings. The same reference numerals are given to the same units in the respective drawings.

First Embodiment

First, a first embodiment of the invention will be described. FIG. 1 is a front view illustrating an appearance configuration of an electronic device 10 in the present embodiment.

The electronic device 10 is an electronic watch with an altitude measurement function for measuring an altitude, for example. The electronic device 10 measures current time and altitude, and calculates a movement distance and consumed energy of a user based on the measured altitude.

The electronic device 10 includes a manipulation input unit 104 and a display unit 105.

The manipulation input unit 104 includes plural (in the present embodiment, four) key input means (manipulation input units) 104A, 104B, 104C, and 104D, for example. Each of the key input means 104A, 104B, 104C, and 104D has a button, receives a manipulation input, and outputs a manipulation signal based on the received manipulation input to a control unit 101.

The key input means 104A receives a manipulation of switching an operation mode by pressing the button, for example. The operation mode includes three types of modes of a "normal mode" in which the measured current time and altitude are displayed, an "altitude log mode" in which altitude information relating to the altitude is recorded, and a "setting mode" in which setting information is selected or confirmed, for example. The electronic device 10 is operated in the operation mode switched according to the manipulation. The three operation modes are cyclically switched whenever the key input means 104A is pressed.

The key input means 104B receives a manipulation of switching information to be displayed in the display unit 105 by pressing the button, for example, when the electronic device 10 is operated in the altitude log mode. The information to be displayed includes "start time altitude display" and "current altitude display", for example. The start time altitude display represents altitude information when the recording is started. The current altitude display represents altitude information that is obtained, when the electronic device 10 is operated in the altitude log mode, at that time point. Further, when the electronic device 10 is operated in the setting mode, the key input means 104B receives a manipulation of switching the type of the setting information by pressing the button, for example. The type of the setting information includes an "ascending movement speed", a "descending movement speed", and a "horizontal movement speed", for example. The ascending movement speed refers to a movement speed when the electronic device 10 is in an ascending state (to be described later). The descending movement speed refers to a movement speed when the electronic device 10 is in a descending state (to be described later). The horizontal movement speed refers to a movement speed when the electronic device 10 is in a horizontal movement state (to be described later). All of the "ascending movement speed", the "descending movement speed", and the "horizontal movement speed" are types of unit information relating to the movement.

The key input means 104C receives a manipulation of switching any candidate among plural setting information candidates with respect to a certain type of setting information, for example, whenever the button is pressed when the electronic device 10 is operated in the setting mode. For example, when the type of the setting information is the ascending movement speed, the setting information candidates are four values of 1, 2, 3, and 4 (km/h). Any one of the setting information candidates is displayed in the display unit 105.

When the electronic device 10 is operated in the setting mode, the key input means 104D receives a manipulation of confirming that the setting information candidate displayed in the display unit 105 is setting information to be used for processing by pressing the button, for example.

The display unit 105 displays the obtained information. The display unit 105 may be a liquid crystal display, a segment display, or the like.

The display unit 105 includes a first display 105a, a second display 105b, and a third display 105c, for example. For example, when the electronic device 10 is operated in the normal mode, the first display 105a displays a time, and the second display 105b displays an altitude. Further, when the electronic device 10 is operated in the altitude log mode, the first display 105a displays an altitude, and the second display 105b displays consumed energy. A display example in the setting mode will be described later.

Figure 2:
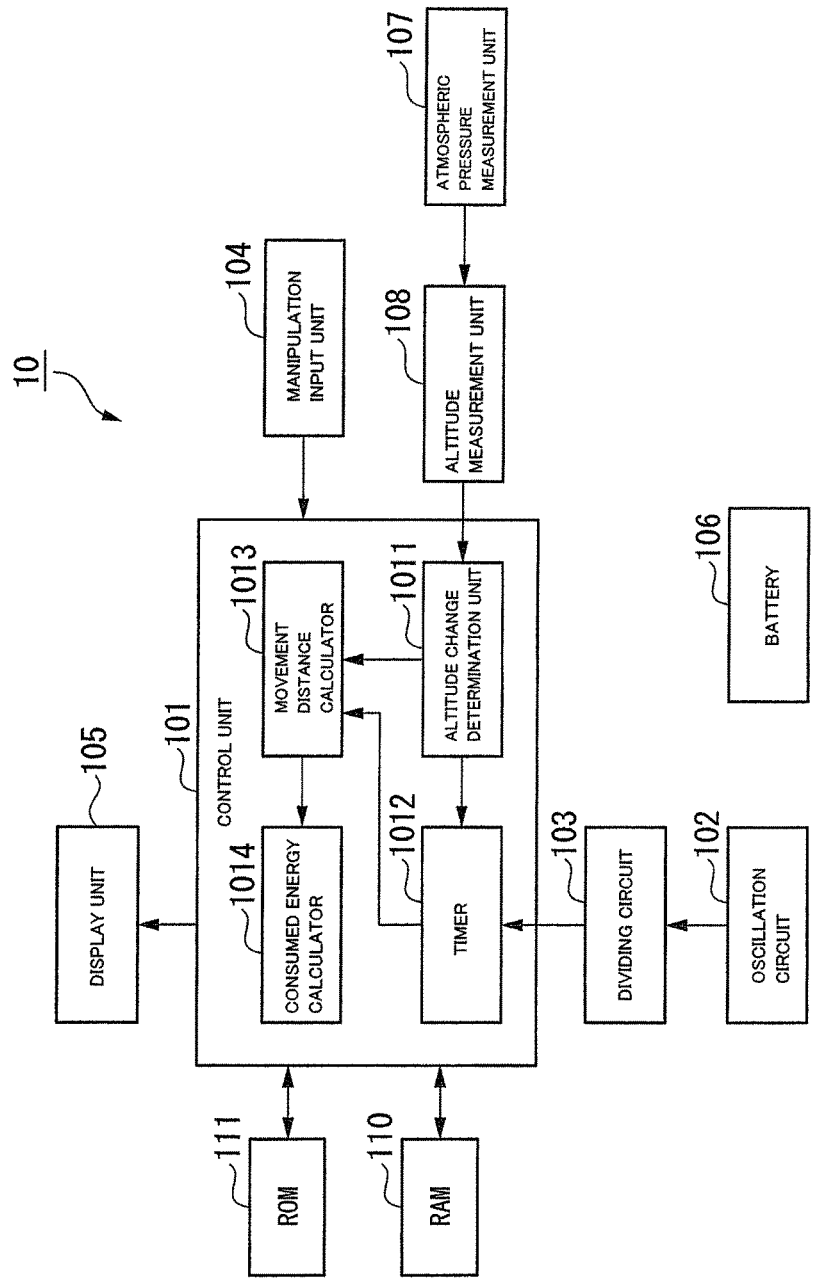
FIG. 2 is a block diagram illustrating a configuration of the electronic device in the first embodiment.

FIG. 2 is a block diagram illustrating a configuration of the electronic device 10 according to the present embodiment.

The electronic device 10 includes a control unit 101, an oscillation circuit 102, a dividing circuit 103, the manipulation input unit 104, the display unit 105, a battery 106, an atmospheric pressure measurement unit 107, an altitude measurement unit 108, a random access memory (RAM) 110, and a read only memory (ROM) 111.

The control unit 101 controls the respective units of the electronic device 10. The control unit 101 is a central processing unit (CPU), for example.

The control unit 101 includes an altitude change determination unit 1011, a timer 1012, a movement distance calculator 1013, and a consumed energy calculator 1014.

The altitude change determination unit 1011 determines an altitude change state based on altitude signals input from the altitude measurement unit 108 within a predetermined time interval (for example, 5 minutes) to a current time, and outputs altitude change data indicating the determined altitude change state to the timer 1012 and the movement distance calculator 1013.

The altitude change state includes the "ascending state", the "descending state", the "horizontal movement state", a "resting state", and a "non-walking state", for example. The ascending state refers to a state where the altitude increases with the lapse of time. The ascending state may appear when the user who holds the electronic device 10 walks on a mountain trail with a rising gradient, for example. The descending state refers to a state where the altitude decreases with the lapse of time. The descending state may appear when the user who holds the electronic device 10 walks on a mountain trail with a falling gradient, for example. The ascending state and the descending state refer to an elevating state where the altitude changes with the lapse of time. The horizontal movement state refers to a state where a significant altitude change according to the movement does not appear. The horizontal movement state may appear when the user who holds the electronic device 10 walks on a flat area, for example. The resting state refers to a non-movement state where the user does not move. The resting state may appear when the user who holds the electronic device 10 is resting, for example. The non-walking state refers to a state where the user moves using means other than walking. The non-walking state may appear when the user who holds the electronic device 10 moves using a transportation system such as a ropeway, a cable car, a railway or an automobile. An example of the process of determining the altitude change state will be described later.

The timer 1012 measures a current time based on a measurement signal input from the dividing circuit 103. Further, whenever the altitude change state indicated by altitude change data input from the altitude change determination unit 1011 is changed, the timer 1012 measures an elapsed time relating to the altitude change state from the time when the altitude change state is changed. The timer 1012 counts the elapsed time based on the measurement signal input from the dividing circuit 103. Further, then, when the altitude change state is changed, the timer 1012 stops the measurement of the elapsed time relating to the altitude change state up to that time, and starts the measurement of the elapsed time relating to the next altitude change state. The timer 1012 cumulatively calculates the elapsed time with the lapse of time while the measurement is being performed, and stops the cumulative calculation of the elapsed time while the measurement is not being performed. Thus, the timer 1012 measures the elapsed time (cumulative elapsed time) accumulated in each altitude change state up to that time point from the time when the measurement is started. The timer 1012 outputs elapsed time data indicating the cumulative elapsed time in each altitude change state to the movement distance calculator 1013.

The timer 1012 may start the measurement of the elapsed time in each altitude change state at a time point when the switching from the normal mode to the altitude log mode is instructed. Further, the timer 1012 may stop the measurement of the elapsed time in each altitude change state at a time point when the switching from the altitude log mode to another operation mode (for example, setting log mode) is instructed.

As described later, when the horizontal movement state continues a predetermined time T or longer, the altitude change determination unit 1011 determines later that the altitude change state is the resting state. Thus, if the altitude change state is switched from the horizontal movement state to the resting state, the timer 1012 stops the measurement of the elapsed time with respect to the horizontal movement state, and subtracts the predetermined time T from the cumulative elapsed time relating to the horizontal movement state. Thus, the distance (movement distance) moved within the predetermined time T relating to the horizontal movement state calculated in the movement distance calculator 1013 is subtracted. In this case, the timer 1012 adds the predetermined time T to the cumulative elapsed time relating to the resting state. Then, the timer 1012 performs the measurement for the resting state until the altitude change state is changed at the next time.

Whenever the altitude change state is changed, the timer 1012 may store the elapsed time relating to the altitude change state immediately before the change in association with the altitude change data in the RAM 110. In this case, the timer 1012 resets the elapsed time measured whenever the altitude change state is changed to zero. Here, the elapsed time is stored in each section interposed between two adjacent time points when the altitude change state is changed. Since the altitude change state is constant in each section, the section is referred to as a constant section.

The movement distance calculator 1013 multiplies the movement speed in each altitude change state (here, ascending state, descending state, or horizontal movement state) stored in the RAM 110 in advance by the cumulative elapsed time in each altitude change state indicated by the elapsed time data input from the timer 1012, to calculate the movement distance in each altitude change state. Specifically, the movement distance calculator 1013 reads the ascending movement speed from the RAM 110, and multiplies the read ascending movement speed by the cumulative elapsed time in the ascending state to calculate the movement distance in the ascending state. Further, the movement distance calculator 1013 reads the descending movement speed from the RAM 110, and multiplies the read descending movement speed by the cumulative elapsed time in the descending state to calculate the movement distance in the descending state. In addition, the movement distance calculator 1013 reads the horizontal movement speed from the RAM 110, and multiplies the read horizontal movement speed by the cumulative elapsed time in the horizontal movement state to calculate the movement distance in the horizontal movement state. The movement distance calculator 1013 outputs movement distance data indicating the movement distance in each calculated altitude change state to the consumed energy calculator 1014.

For example, the ascending movement speed or the descending movement speed is in a range between 1 km/h and 4 km/h, and the horizontal movement speed is in a range between 3 km/h and 6 km/h.

When the elapsed time in each altitude change state is stored in the RAM 110 in each constant section, the movement distance calculator 1013 in each altitude change state accumulates the elapsed time in each constant section immediately before being stored in the RAM 110 to calculate the cumulative elapsed time. Further, the movement distance calculator 1013 adds the elapsed time (not accumulated) relating to the altitude change state indicated by the elapsed time data input from the timer 1012 to the cumulative elapsed time relating to the altitude change state to update the cumulative elapsed time. Then, the movement distance calculator 1013 multiplies the cumulative elapsed time in each altitude change state by the movement speed in each altitude change state (except for the resting state) stored in the RAM 110 to calculate the movement speed in each altitude change state.

As described above, when the horizontal movement state continues for the predetermined time T or longer, the altitude change determination unit 1011 determines later that the altitude change state is the resting state. In the present embodiment, if the altitude change state is switched from the horizontal movement state into the resting state, the timer 1012 corrects the cumulative elapsed time relating to the predetermined time T, but the invention is not limited thereto. For example, the movement distance calculator 1013 may correct the movement distance relating to the predetermined time T. Specifically, if the altitude change state is switched from the horizontal movement state into the resting state, the movement distance calculator 1013 subtracts the movement distance according to the predetermined time T to calculate the movement distance of the horizontal movement state. Specifically, the movement distance calculator 1013 subtracts a value obtained by multiplying the predetermined time T by the horizontal movement speed from the movement distance in the horizontal movement state. Since the movement speed is 0 in the resting state, the movement distance calculator 1013 may not correct the movement distance.

The consumed energy calculator 1014 calculates the consumed energy based on the movement distance data input from the movement distance calculator 1013. The consumed energy calculator 1014 adds, between the altitude change states, a multiplied value obtained by multiplying the movement distance in each altitude change state (here, ascending state, descending state or horizontal movement state) indicated by the input movement distance data by a weighting factor in each altitude change state stored in the RAM 110 in advance, to calculate the consumed energy per unit weight. The weighting factor represents consumed energy per unit weight and unit movement distance. The consumed energy calculator 1014 multiplies the calculated consumed energy by the weight stored in the RAM 110 in advance to calculate the consumed energy. The weight and the weighting factor may be set based on a manipulation signal input from the manipulation input unit 104. Here, the weight may be the body weight of the user, or may be a total value of the body weight and the weight of accessories, for example, baggage.

The control unit 101 generates altitude data indicating altitudes sampled by the altitude change determination unit 1011. When the electronic device 10 is operated in the normal mode, or when the electronic device 10 is operated in the altitude log mode and the manipulation signal is not input from the key input means 104B, the control unit 101 outputs time data indicating the calculated current time and the generated altitude information to the display unit 105, and allows the display unit 105 to display the current time and the altitude.

Further, the control unit 101 performs a process based on the manipulation signal input from the manipulation input unit 104. For example, when the electronic device 10 is operated in the normal mode, if the manipulation signal (altitude log mode) is input from the key input means 104A, the control unit 101 switches the operation mode from the normal mode to the altitude log mode, and starts the operation in the above-mentioned altitude log mode. In the altitude log mode, the control unit 101 stores the altitude information in the RAM 110 as a log file at a predetermined time interval.

Further, when the electronic device 10 is operated in the altitude log mode, if the manipulation signal (setting mode) is input from the key input means 104A, the control unit 101 switches the operation mode from the altitude log mode to the setting mode to stop the recording of the altitude information.

Further, when the electronic device 10 is operated in the setting mode, if the manipulation signal (normal mode) is input from the key input means 104A, the control unit 101 switches the operation mode from the setting mode to the normal mode.

When the electronic device 10 is operated in the altitude log mode and displays the currently obtained altitude information, if the manipulation signal (start time display) is input from the key input means 104B, the control unit 101 reads the altitude information at the time point (start time) when the recording starts from the RAM 110. The control unit 101 outputs the read altitude information to the display unit 105 to be displayed.

When the electronic device 10 is operated in the altitude log mode, if the manipulation signal (current altitude display) is input from the key input means 104B, the control unit 101 outputs the current altitude information and the consumed energy calculated by the consumed energy calculator 1014 to the display unit 105 to be displayed.

When the electronic device 10 is operated in the setting mode, if the manipulation signal is input from the key input means 104B, the control unit 101 reads any one of plural types of setting information files stored in the RAM 110 in advance. The control unit 101 outputs any one of the pieces of setting information included in the read setting information file to the display unit 105 to be displayed. The setting information file is formed as a setting information file that varies according to the type of the setting information. The control unit 101 cyclically switches the setting information file to be read whenever the manipulation signal is input.

When the electronic device 10 is operated in the setting mode, whenever the manipulation signal is input from the key input means 104C, the control unit 101 cyclically switches the setting information to be output to the display unit 105 among the setting information included in the read setting information file.

When the electronic device 10 is operated in the setting mode, and when the manipulation signal is input from the key input means 104D, the control unit 101 selects (confirms) the setting information output to the display unit 105 among the setting information included in the read setting information file as setting information to be used for the process. The control unit 101 writes the selected setting information in the RAM 110 for setting, and sets the selected setting information for a configuration unit (for example, the movement distance calculator 1013) where the setting information (for example, the ascending movement speed) is used.

The oscillation circuit 102 generates an oscillation signal of a predetermined frequency (oscillation frequency, for example, 32768 Hz), and outputs the generated oscillation signal to the dividing circuit 103.

The dividing circuit 103 divides the oscillation frequency of the oscillation signal input from the oscillation circuit 102 to generate a measurement signal of a predetermined frequency (clock frequency, for example, 100 Hz) that is a measurement reference.

The battery 106 supplies power for operation to the respective units that form the electronic device 10.

The atmospheric pressure measurement unit 107 measures atmospheric pressure, and outputs an atmospheric pressure signal indicating the measured atmospheric pressure to the altitude measurement unit 108. The atmospheric pressure measurement unit 107 is an atmospheric pressure sensor, for example.

The altitude measurement unit 108 measures the altitude based on the atmospheric pressure signal input from the atmospheric pressure measurement unit 107, and outputs an altitude signal indicating the measured altitude to the control unit 101. When measuring the altitude, the altitude measurement unit 108 converts the atmospheric pressure P indicated by the input atmospheric pressure signal into the altitude h using Expression (1), for example.

$$h = \{(P_0/P)^{(1/5.257)} - 1\} \cdot (T + 273.15)/0.0065 \qquad (1)$$

In Expression (1), $P_0$ represents atmospheric pressure 1013 hPa at a predetermined elevation, for example, at an elevation of 0 m (height above sea level). T represents temperature (° C.).

The atmospheric pressure measurement unit 107 and the altitude measurement unit 108 form an altimeter that measures the altitude.

The RAM (storage unit) 110 stores data used for operation in the respective units of the electronic device 10, and data generated in the respective units. The RAM 110 stores the altitude information as a log file, for example. Further, the RAM 110 stores the setting information file relating to the state determination, the setting information file relating to the movement speed, and the setting information file relating to the consumed energy. In the setting file relating to the state determination, the predetermined time T that is a threshold value of a time for determination of the resting state is stored. In the setting information file relating to the movement speed, the ascending movement speed, the descending movement speed, and the horizontal movement speed are stored as the setting information relating to the movement speed. Further, in the setting information file relating to the consumed energy, the weighting factor in the ascending state, the weighting factor in the descending state, the weighting factor in the horizontal movement state, and the weight are stored as the setting information relating to the consumed energy. The setting information stored in the RAM 110 may be variably set based on the manipulation signal from the manipulation input unit 104.

The ROM 111 stores in advance an operation program executed by the control unit 101. The operation program is read when the control unit 101 is started, and the control unit 101 executes the process designated by the read operation program.

Next, an example of the process of determining the altitude change state by the altitude change determination unit 1011 according to the present embodiment will be described with reference to FIGS. 3 and 4. The altitude change determination unit 1011 samples the altitudes indicated by the altitude signals input from the altitude measurement unit 108 at a predetermined time interval (sampling interval, for example, 1 minute) Δt. In the following description, each of the times when the sampling is performed may be referred to as a "sampling time". Further, the altitude change determination unit 1011 determines the altitude change state based on the altitudes sampled in a section from a time t−ΔT that is the predetermined time interval ΔT before a current time t to the current time t. The section from the time t−ΔT1 to the current time t is referred to as a "determination section". The altitude change determination unit 1011 may compare a distribution of the altitudes sampled within the determination section with a predetermined altitude range around a current altitude h to determine the altitude change state. The current altitude h represents an altitude sampled at that time point, that is, at the current time t. In this way, by comparing the distribution of the altitudes sampled within the determination section with the predetermined altitude range around the current altitude h, the altitude change determination unit 1011 can stably determine the altitude change state without receiving the influence of a measurement error or noise.

Figure 3:
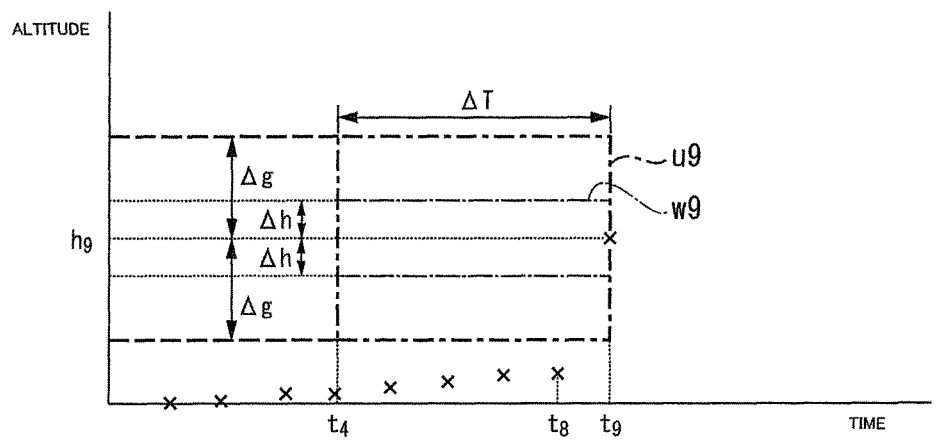
FIG. 3 is a diagram illustrating an altitude distribution example in a non-walking state.

FIG. 3 is a diagram illustrating a distribution example of altitudes in the non-walking state. In FIG. 3, the transverse axis represents time, and the longitudinal axis represents altitude, respectively. x represents the altitude sampled at each sampling time. Further, a rectangle indicated by a thin one-dot chain line in FIG. 3 represents a detection window w9 in the elevating state, and a rectangle indicated by a thick one-dot chain line represents a detection window u9 in the non-walking state. Hereinafter, a case where the current time is $t_9$ will be described. The detection window w9 in the elevating state represents a determination section of which a time range is from $t_4$ to $t_9$ and an altitude range is from $h_9$−Δh to $h_9$+Δh. Here, $h_9$ represents the altitude at sampling time $t_9$. Δh is a first altitude threshold value that is determined in advance. The first altitude threshold value Δh is a value that is acknowledged to have a significant altitude change compared with the measurement error (for example, 5 m). The detection window u9 in the non-walking state represents a determination section of which a time range is from $t_4$ to $t_9$ and an altitude range is from $h_9$−Δg to $h_9$+Δg. Δg is a second altitude threshold value that is determined in advance. The second altitude threshold value Δg is a value relating to a speed that is not easily obtained or is not assumed by human's walking (for example, 180 m), and is greater than the first altitude threshold value Δh.

For example, when the user moves using a transportation system such as a ropeway, the altitude is rapidly changed compared with walking. In the example shown in FIG. 3, the altitude rapidly ascends from the immediately previous time $t_8$ of the current time $t_9$ to the current time $t_9$. Thus, when detecting the rapid change of the altitude, the altitude change determination unit 1011 according to the present embodiment determines that the altitude change state is the non-walking state. Specifically, when all of the altitudes sampled in the determination section are not within the detection window in the non-walking state, the altitude change determination unit 1011 determines that the altitude change state is the "non-walking state". That is, when an altitude that is higher than an altitude h+Δg higher than the current altitude h by the second altitude threshold value Δg is included in the determination section, or when an altitude that is lower than an altitude h−Δg lower than the current altitude h by the second altitude threshold value Δg is included in the determination section, the altitude change determination unit 1011 determines that the altitude change state is the non-walking state. Since the second altitude threshold value Δg is a value relating to a speed that is not easily obtained or is not assumed by human's walking, when the altitude that is higher than the altitude h+Δg is included in the determination section, it can be determined that the altitude rapidly descends. Further, when the altitude that is lower than the altitude h−Δg is included in the determination section, it can be determined that the altitude rapidly ascends. In the example shown in FIG. 3, altitudes at the respective times $t_4$ to $t_8$ are distributed below the detection window u9 in the non-walking state. Accordingly, the altitude change determination unit 1011 determines that the altitude change state at the current time $t_9$ is the "non-walking state".

Figure 4:
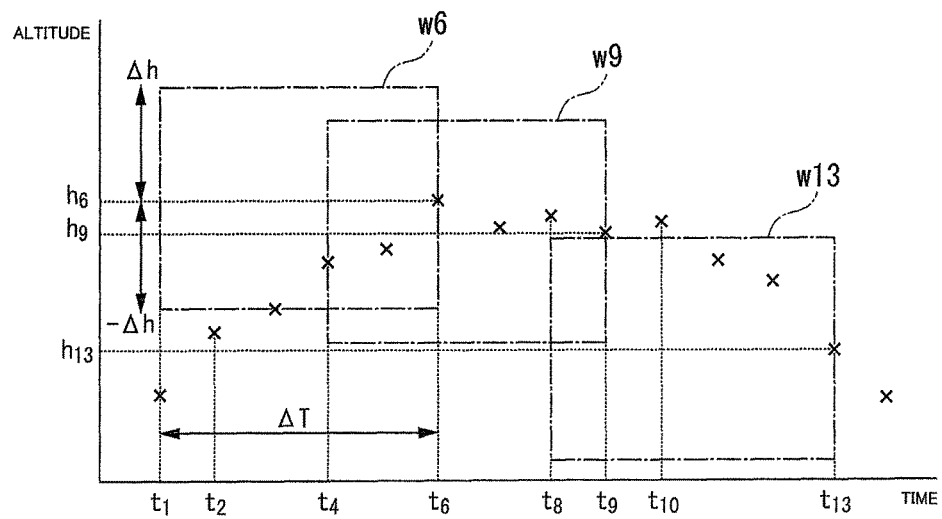
FIG. 4 is a diagram illustrating an altitude distribution example in each altitude change state.

FIG. 4 is a diagram illustrating a distribution example of altitudes in each altitude change state. In FIG. 4, the transverse axis represents time, and the longitudinal axis represents altitude, respectively. x represents the altitude sampled at each sampling time. Further, rectangles indicated by one-dot chain lines represent detection windows w6, w9, and w13 in the elevating state, respectively. The detection window w6 is a detection window in the elevating state at time $t_6$, and represents a determination section of which a time range is from $t_1$ to $t_6$ and an altitude range is from $h_6-\Delta h$ to $h_6+\Delta h$. Here, $h_6$ represents the altitude at sampling time $t_6$. The detection window w9 is a detection window in the elevating state at time $t_9$, and represents a determination section of which a time range is from $t_4$ to $t_9$ and an altitude range is from $h_9-\Delta h$ to $h_9+\Delta h$. Here, $h_9$ represents the altitude at sampling time $t_9$. The detection window w13 is a detection window in the elevating state at time $t_{13}$, and represents a determination section of which a time range is from is to $t_{13}$ and an altitude range is from $h_{13}-\Delta h$ to $h_{13}+\Delta h$. Here, $h_{13}$ represents the altitude at sampling time $t_{13}$. In the example shown in FIG. 4, it is assumed that the user walks on a road with a rising gradient from time $t_1$ to time $t_6$, walks on a road without a gradient from time $t_6$ to time $t_9$, and walks on a road with a falling gradient from time $t_9$ to time $t_{13}$.

For example, when the user walks on the road with the rising gradient, the altitude smoothly ascends. In the example shown in FIG. 4, the altitude gradually ascends in the section from time $t_1$ to time $t_6$. When the altitude ascends with time in the determination section in a case other than the non-walking state, the altitude change determination unit 1011 determines that the altitude change state is the ascending state. Specifically, when the altitude sampled in the determination section is present in a range lower than the detection window in the elevating state when the altitude change state is not the non-walking state, the altitude change determination unit 1011 determines that the altitude change state is the ascending state. That is, when an altitude that is lower than the altitude $h-\Delta h$ lower than the current altitude h by the first altitude threshold value $\Delta h$ is included in the determination section when the altitude change state is not the non-walking state, the altitude change determination unit 1011 determines that the altitude change state is the ascending state. In this example, the altitude at time $t_1$ and the altitude at time $t_2$ among the altitudes sampled in the determination section are respectively lower than the detection window w6 in the elevating state. Accordingly, the altitude change determination unit 1011 determines that the altitude change state at time $t_6$ is the "ascending state".

Further, when the user walks on the road with the falling gradient, the altitude smoothly descends. In the example shown in FIG. 4, the altitude gradually descends in the section from time $t_9$ to time $t_{13}$. When the altitude descends with time in the determination section when the altitude change state is not the non-walking state, the altitude change determination unit 1011 determines that the altitude change state is the descending state. Specifically, when the altitude sampled in the determination section is present in a range higher than the detection window in the elevating state when the altitude change state is not the non-walking state, the altitude change determination unit 1011 determines that the altitude change state is the descending state. That is, when an altitude that is higher than the altitude $h+\Delta h$ higher than the current altitude h by the first altitude threshold value $\Delta h$ is included in the determination section, the altitude change determination unit 1011 determines that the altitude change state is the descending state. In this example, the altitudes at times $t_8$ to $t_{10}$ among the altitudes sampled in the determination section are respectively higher than the detection window w13 in the elevating state. Accordingly, the altitude change determination unit 1011 determines that the altitude change state at time $t_{13}$ is the "descending state".

Further, when the user walks on the road without the gradient, a variation of the altitude is smaller than a predetermined variation. In the example shown in FIG. 4, the variation of the altitude is small in a section from time $t_6$ to time $t_9$. When the variation of the altitude is small, the altitude change determination unit 1011 determines that the altitude change state is the horizontal movement state. Specifically, when all altitudes sampled in the determination section are presents in the range of the detection window in the elevating state, the altitude change determination unit 1011 determines that the altitude change state is the horizontal movement state. That is, when all the altitudes included in the determination section are within the range from $h-\Delta h$ to $h+\Delta h$, the altitude change determination unit 1011 determines that the altitude change state is the horizontal movement state. In this example, all the altitudes sampled in the determination section are included in the detection window w9. Accordingly, the altitude change determination unit 1011 determines that the altitude change state at time $t_9$ is the "horizontal movement state".

The altitudes sampled in the determination section may include both of an altitude lower than the altitude $h-\Delta h$ and an altitude higher than the altitude $h+\Delta h$. In this case, the altitude change determination unit 1011 may determine the altitude change state at the current time t based on the altitude at time t' closest to the current time t among the altitude lower than the altitude $h-\Delta h$ and the altitude higher than the altitude $h+\Delta h$, for example. That is, when the altitude at time t' is lower than the altitude $h-\Delta h$, the altitude change determination unit 1011 determines that the altitude change state at the current time t is the ascending state. Further, when the altitude at time t' is higher than the altitude $h+\Delta h$, the altitude change determination unit 1011 determines that the altitude change state at the current time t is the descending state.

Further, the altitude change determination unit 1011 may compare the number of the altitude samples lower than the altitude $h-\Delta h$ included in the altitudes sampled in the determination section with the number of the altitude samples higher than the altitude $h+\Delta h$ to determine the altitude change state at the current time t. That is, if the number of the altitude samples lower than the altitude $h-\Delta h$ is greater than the number of the altitude samples higher than the altitude $h+\Delta h$, the altitude change determination unit 1011 determines that the altitude change state is the ascending state. If the number of the altitude samples lower than the altitude $h-\Delta h$ is equal to the number of the altitude samples higher than the altitude $h+\Delta h$, the altitude change determination unit 1011 determines that the altitude change state is the non-elevating state. If the number of the altitude samples lower than the altitude $h-\Delta h$ is smaller than the number of the altitude samples higher than the altitude $h+\Delta h$, the altitude change determination unit 1011 determines that the altitude change state is the descending state.

In addition, the altitude change determination unit 1011 may determine that the altitude change state is the ascending state when the average value of the altitudes sampled in the determination section is lower than the altitude h−Δh, may determine that the altitude change state is the descending state when the average value of the altitudes sampled in the determination section is higher than the altitude h+Δh, and may determine that the altitude change state is the non-elevating state in other cases.

Further, the altitude change determination unit 1011 may compare the current altitude h with an altitude $h_t-\Delta_T$ at the time t−ΔT that is the time interval ΔT before the current time t to determine the altitude change state. For example, when the difference between the current altitude h and the altitude $h_t-\Delta_T$ at the time t−ΔT is greater than a positive threshold value that is a predetermined altitude difference, the altitude change determination unit 1011 determines that the altitude change state is the ascending state. Further, when the difference between the current altitude h and the altitude $h_t-\Delta_T$ at the time t−ΔT is smaller than a negative threshold value that is a predetermined altitude difference, the altitude change determination unit 1011 determines that the altitude change state is the descending state. In other cases, the altitude change determination unit 1011 determines that the altitude change state is the non-elevating state.

At the time when it is determined that the altitude change state is the horizontal movement state is continued longer than a predetermined time T (for example, 20 minutes), the altitude change determination unit 1011 determines that the altitude change state is the resting state. The predetermined time T may be any value (for example, 15 minutes to 30 minutes) as long as it is longer than a rest time at an interval (for example, repetition of 10 minutes rest after 50 minutes walking) recommended in mountain climbing or hiking. Thus, the rest time at the regularly repeated interval is distinguished from an irregularly long rest time (for example, for a meal or the like), and the rest time at the interval is handled as a part of the walking state (the ascending state, the descending state, and the horizontal movement state).

Further, as described above, since it is determined later that the altitude change state is the resting state after it is determined that the altitude change state is the horizontal movement state, the time when it is determined that the altitude change state is the horizontal movement state becomes a surplus by the predetermined time T. In this case, the timer 1012 may subtract the surplus predetermined time T from the elapsed time relating to the horizontal movement state to correct the elapsed time relating to the horizontal movement state. Alternatively, the movement distance calculator 1013 may subtract the distance obtained by multiplying the predetermined time T by the horizontal movement speed to calculate the movement distance in the horizontal movement state, thereby correcting the movement distance in the horizontal movement state.

Next, an altitude change state determination process executed by the electronic device 10 will be described.

Figure 5:
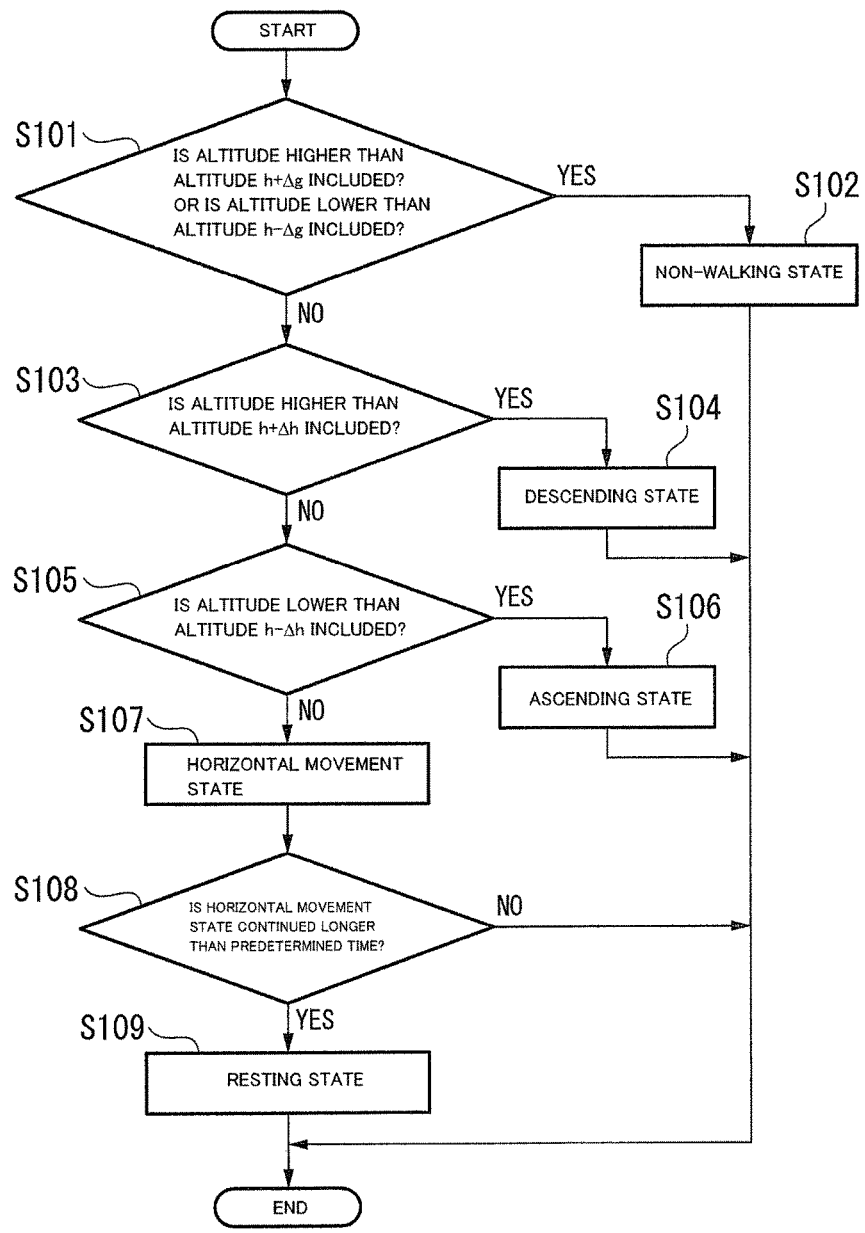
FIG. 5 is a flowchart illustrating an altitude change state determination process executed by the electronic device according to the first embodiment.

FIG. 5 is a flowchart illustrating the altitude change state determination process executed by the electronic device 10 according to the present embodiment.

In step S101, the altitude change determination unit 1011 determines whether an altitude that is higher than the altitude h+Δg higher than the current height h by the second altitude threshold value Δg or an altitude that is lower than the altitude h−Δg lower than the current altitude h by the second altitude threshold value Δg is included in the determination section. If it is determined by the altitude change determination unit 1011 that the altitude higher than the altitude h+Δg or the altitude lower than the altitude h−Δg is included in the determination section (Yes in step S101), the procedure proceeds to step S102. On the other hand, if it is determined by the altitude change determination unit 1011 that all the altitudes in the determination section are within the range from the altitude h−Δg to the altitude h+Δg (No in step S101), the procedure proceeds to step S103.

In step S102, the altitude change determination unit 1011 determines that the altitude change state is the non-walking state, and then, the process is finished.

In step S103, the altitude change determination unit 1011 determines whether an altitude that is higher than the altitude h+Δh higher than the current altitude h by the first altitude threshold value Δh is included in the determination section. If it is determined by the altitude change determination unit 1011 that the altitude that is higher than the altitude h+Δh is included in the determination section (Yes in step S103), the procedure proceeds to step S104. If it is determined by the altitude change determination unit 1011 that all the altitudes in the determination section are the altitude h+Δh or lower (No in step S103), the procedure proceeds to step S105.

In step S104, the altitude change determination unit 1011 determines that the altitude change state is the descending state, and then, the process is finished.

In step S105, the altitude change determination unit 1011 determines whether an altitude that is lower than the altitude h−Δh lower than the current altitude h by the first altitude threshold value Δh is included in the determination section. If it is determined by the altitude change determination unit 1011 that the altitude that is lower than the altitude h−Δh is included in the determination section (Yes in step S105), the procedure proceeds to step S106. On the other hand, if it is determined by the altitude change determination unit 1011 that all the altitudes in the determination section are the altitude h−Δh or higher (No in step S105), the procedure proceeds to step S107.

In step S106, the altitude change determination unit 1011 determines that the altitude change state is the ascending state, and then, the process is finished.

In step S107, the altitude change determination unit 1011 determines that the altitude change state is the horizontal movement state, and then, the procedure proceeds to step S108.

In step S108, the altitude change determination unit 1011 determines whether the horizontal movement state is continued longer than the predetermined time T. If it is determined by the altitude change determination unit 1011 that the horizontal movement state is not continued longer than the predetermined time T (No in step S108), the process is finished.

On the other hand, if it is determined by the altitude change determination unit 1011 that the horizontal movement state is continued longer than the predetermined time T (Yes in step S108), the procedure proceeds to step S109.

In step S109, the altitude change determination unit 1011 determines that the altitude change state is the resting state, and then, the process is finished.

Next, measurement data processing executed by the electronic device 10 according to the present embodiment will be described.

Figure 6:
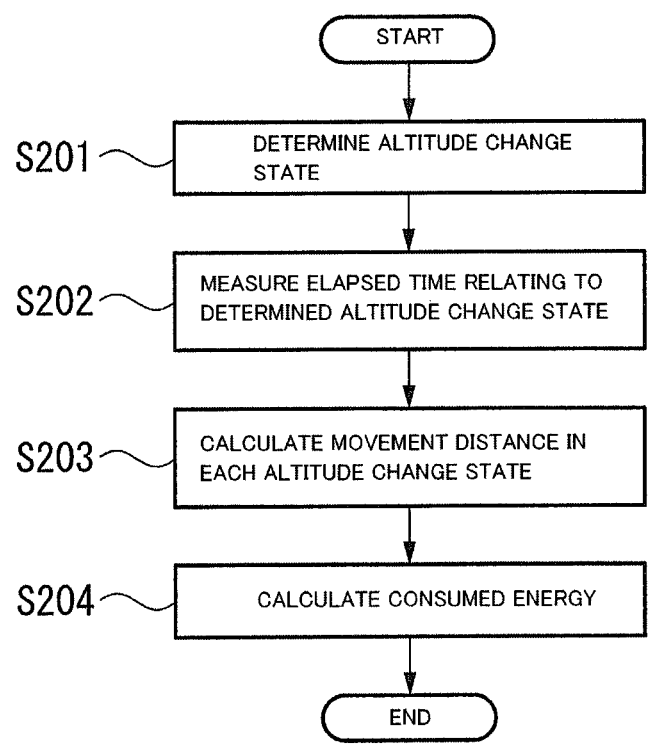
FIG. 6 is a flowchart illustrating measurement data processing executed by the electronic device according to the first embodiment.

FIG. 6 is a flowchart illustrating the measurement data processing executed by the electronic device 10 according to the present embodiment.

In step S201, the altitude change determination unit 1011 determines the altitude change state at the current time. The process of determining the altitude change state may be the process shown in FIG. 5. Then, the procedure proceeds to step S202.

In step S202, the timer 1012 measures the elapsed time relating to the altitude change state determined by the altitude change determination unit 1011 in step S201. Then, the procedure proceeds to step S203.

In step S203, the movement distance calculator 1013 calculates the movement distance in each altitude change state. Specifically, the movement distance calculator 1013 reads the movement speed in each altitude change state from the RAM 110, and multiplies the cumulative elapsed time in each altitude change state calculated by the timer 1012 by the read movement speed to calculate the movement distance in each altitude change state. Then, the procedure proceeds to step S204.

In step S204, the consumed energy calculator 1014 calculates the consumed energy. Specifically, the consumed energy calculator 1014 reads the weighting factor in each altitude change state from the RAM 110, and multiplies the movement distance in each altitude change state calculated by the movement distance calculator 1013 by the read weighting factor, respectively. Then, the consumed energy calculator 1014 adds the multiplied value in the ascending state, the multiplied value in the descending state and the multiplied value in the horizontal movement state that are calculated to calculate the consumed energy per unit weight. Further, the consumed energy calculator 1014 reads the weight from the RAM 110, and multiplies the consumed energy per unit weight by the read weight to calculate the consumed energy. Then, the process is finished.

As described above, the electronic device 10 according to the present embodiment includes the RAM 110 that stores the movement speed in each altitude change state, the weighting factor in each altitude change state, and the weight in advance, the altitude change determination unit 1011 that determines the altitude change state based on the altitude change, the timer 1012 that measures the elapsed time in each altitude change state, the movement distance calculator 1013 that calculates the movement distance in each altitude change state, and the consumed energy calculator 1014 that calculates the consumed energy in each altitude change state and sums the consumed energy in each altitude change state to calculate the consumed energy.

Thus, the electronic device 10 can calculate the consumed energy of the user without detecting landing of each step. In the electronic device 10, since a sensor having high accuracy is not necessary, the manufacturing cost of the electronic device 10 can be reduced. Further, in the electronic device 10, it is not necessary to reduce the sampling interval for detection of the atmospheric pressure, and the amount of power consumption and computation for calculating the consumed energy can be reduced.

Second Embodiment

Next, a second embodiment of the invention will be described.

Figure 7:
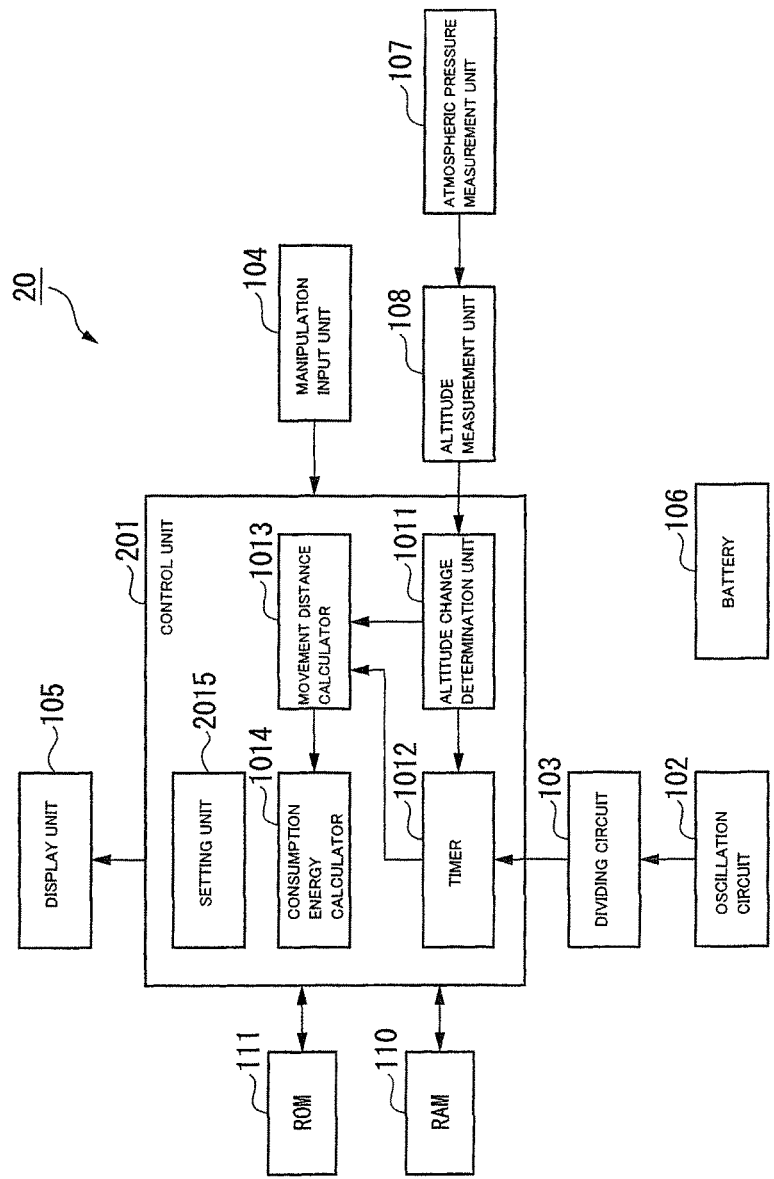
FIG. 7 is a block diagram illustrating a configuration of an electronic device according to a second embodiment of the invention.

FIG. 7 is a block diagram illustrating a configuration of an electronic device 20 according to the present embodiment.

The electronic device 20 includes a control unit 201 instead of the control unit 101 in the electronic device 10 (FIG. 2) in the first embodiment. Since other configurations of the electronic device 20 are the same as the configurations of the electronic device 10 in the first embodiment, the description will not be repeated. The control unit 201 includes a setting unit 2015 in addition to the configuration of the control unit 101 in the first embodiment. Since other configurations of the control unit 201 are the same as the configurations of the control unit 101 in the first embodiment, the description will not be repeated.

The setting unit 2015 sets the movement speed in each altitude change state in the RAM 110 based on the manipulation signal input from the manipulation input unit 104. For example, when the electronic device 20 is operated in the setting mode, if the manipulation signal is input from the key input means 104B, the setting unit 2015 reads a setting information file relating to the movement speed from the RAM 110, and displays the setting information included in the read setting information file in the display unit 105. In the setting information file relating to the movement speed, the ascending movement speed, the horizontal movement speed, and the descending movement speed are stored as the setting information. Specifically, the setting unit 2015 displays the ascending movement speed in the first display 105a, displays the horizontal movement speed in the second display 105b, and displays the descending movement speed in the third display 105c. In this way, by displaying all the movement speeds to be set in the display unit 105 side by side, it is possible to prevent the setting unit 2015 from setting only one type of movement speed (for example, the ascending movement speed) and to forget setting of another movement speed (for example, the descending movement speed).

When the setting information relating to the movement speed is displayed in the display unit 105, if the manipulation signal is input from the key input means 104C, the setting unit 2015 changes the movement speed relating to the setting information. Here, the setting unit 2015 sets the horizontal movement speed so as not to be smaller than the ascending movement speed. Thus, it is possible to prevent an abnormal setting such that the ascending movement speed is higher than the horizontal movement speed. Further, when the movement speed relating to the setting information is displayed in the display unit 105, if the manipulation signal is input from the key input means 104D, the setting unit 2015 confirms the movement speed. Here, the setting unit 2015 stores the setting information indicating the movement speed in the RAM 110.

The setting unit 2015 may set the predetermined time T based on the manipulation signal from the manipulation input unit 104. For example, when the electronic device 20 is operated in the setting mode, if the manipulation signal is input from the key input means 104B, the setting unit 2015 reads the setting information file relating to the predetermined time T from the RAM 110, and displays the setting information included in the read setting information file in the display unit 105. When the setting information relating to the predetermined time T is displayed in the display unit 105, if the manipulation signal is input from the key input means 104C, the setting unit 2015 changes predetermined time relating to the setting information. Further, when the predetermined time T relating to the setting information is displayed in the display unit 105, if the manipulation signal is input from the key input means 104D, the setting unit 2015 confirms the predetermined time T. Here, the setting unit 2015 stores the setting information indicating the predetermined time T in the RAM 110. Thus, the predetermined time T that is a threshold value for determining whether the altitude change state transitions to the resting state can be set by the manipulation of the user.

Next, a specific example of a setting screen relating to the movement distance displayed by the display unit 105 will be described with reference to FIGS. 8A to 8D, and FIGS. 9A to 9D.

FIGS. 8A to 8D are diagrams illustrating an example of the setting screen displayed by the display unit 105 in the present embodiment.

The setting unit 2015 displays the ascending movement speed in the first display 105a, displays the horizontal movement speed in the second display 105b, and displays the descending movement speed in the third display 105c. Hereinafter, a case where the movement distance in the ascending state displayed in the first display 105a is set will be described as an example.

Figure 8A:
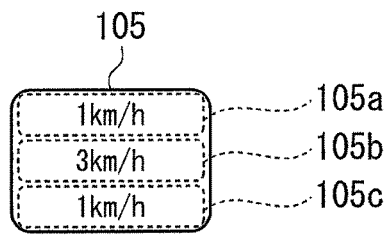
FIGS. 8A to 8D are diagrams illustrating an example of a setting screen displayed by a display unit according to the second embodiment.
Figure 8B:
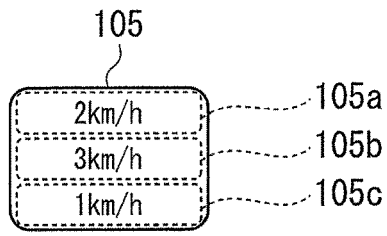
Figure 8C:
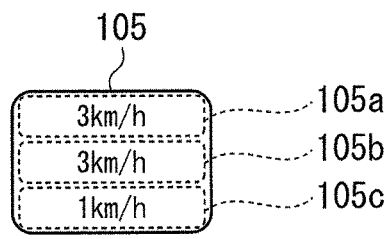
Figure 8D:
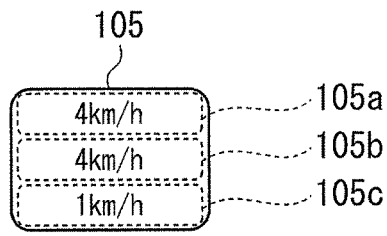

In an initial state, the ascending movement speed is set to 1 km/h, the horizontal movement speed is set to 3 km/h, and the descending movement speed is set to 1 km/h (see FIG. 8A). Whenever the manipulation signal is input from the key input means 104C, the setting unit 2015 increases the ascending movement speed to 1 km/h, 2 km/h, 3 km/h, and 4 km/h by 1 km/h, and cyclically changes the ascending movement speed between 1 km/h and 4 km/h. For example, if the manipulation signal is input from the key input means 104C in the state shown in FIG. 8A, the setting unit 2015 changes the ascending movement speed to 2 km/h (see FIG. 8B). Then, if the manipulation signal is input from the key input means 104C in the state shown in FIG. 8B, the setting unit 2015 changes the ascending movement speed to 3 km/h (see FIG. 8C). Then, if the manipulation signal is input from the key input means 104C in the state shown in FIG. 8C, the setting unit 2015 changes the ascending movement speed to 4 km/h (see FIG. 8D).

Here, in order to prevent the ascending movement speed from becoming higher than the horizontal movement speed, the setting unit 2015 changes the horizontal movement speed from 3 km/h to 4 km/h. That is, while the switching is performed so that the ascending movement speed becomes high, after the horizontal movement speed becomes equal to the ascending movement speed, the setting unit 2015 sets the horizontal movement speed to become high together with the ascending movement speed. Thus, it is possible to prevent the ascending movement speed from becoming higher than the horizontal movement speed.

FIGS. 9A to 9D are diagrams illustrating another example of the setting screen displayed by the display unit 105 according to the present embodiment. As shown in FIGS. 9A to 9D, the setting unit 2015 displays the ascending movement speed in the first display 105a, displays the horizontal movement speed in the second display 105b, and displays the descending movement speed in the third display 105c. Hereinafter, a case where the horizontal movement speed displayed in the second display 105b is set will be described as an example.

Figure 9A:
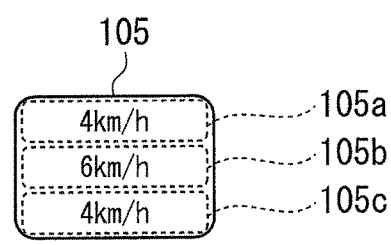
FIGS. 9A to 9D are diagrams illustrating another example of a setting screen displayed by the display unit according to the second embodiment.
Figure 9B:
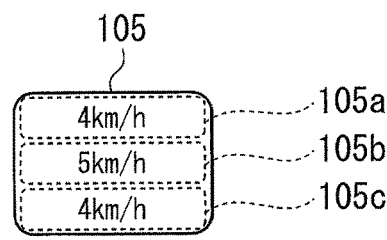
Figure 9C:
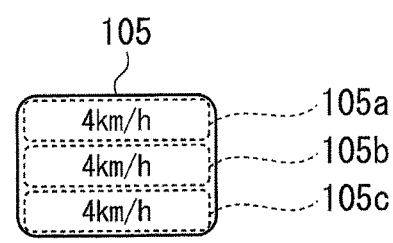
Figure 9D:
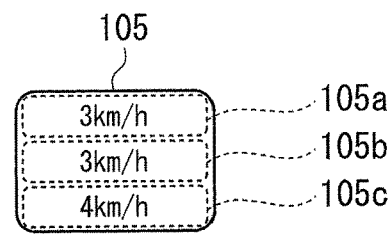

In an initial state, the ascending movement speed is set to 4 km/h, the horizontal movement speed is set to 6 km/h, and the descending movement speed is set to 4 km/h (see FIG. 9A). Whenever the manipulation signal is input from the key input means 104C, the setting unit 2015 reduces the horizontal movement speed to 6 km/h, 5 km/h, 4 km/h, and 3 km/h by 1 km/h, and cyclically changes the horizontal movement speed between 6 km/h and 3 km/h. For example, if the manipulation signal is input from the key input means 104C in the state shown in FIG. 9A, the setting unit 2015 changes the horizontal movement speed to 5 km/h (see FIG. 9B). Then, if the manipulation signal is input from the key input means 104C in the state shown in FIG. 9B, the setting unit 2015 changes the horizontal movement speed to 4 km/h (see FIG. 9C). Then, if the manipulation signal is input from the key input means 104C in the state shown in FIG. 9C, the setting unit 2015 changes the horizontal movement speed to 3 km/h (see FIG. 9D). Here, the setting unit 2015 changes the ascending movement speed from 4 km/h to 3 km/h in order to prevent the ascending movement speed from becoming higher than the horizontal movement speed. That is, while the switching is performed so that the horizontal movement speed becomes low, after the horizontal movement speed becomes equal to the ascending movement speed, the setting unit 2015 sets the ascending movement speed to become low together with the horizontal movement speed. Thus, it is possible to prevent the ascending movement speed from becoming higher than the horizontal movement speed.

As described above, the electronic device 20 according to the present embodiment displays all the movement speeds to be set in the display unit 105 side by side. Thus, it is possible to prevent the setting unit 2015 from setting only one type of movement speed (for example, the ascending movement speed) and to forget setting of another movement speed (for example, the descending movement speed). Further, when setting the movement speed in each altitude change state, the electronic device 20 sets the horizontal movement speed so as not to be smaller than the ascending movement speed. Thus, it is possible to prevent an abnormal setting such that the ascending movement speed is higher than the horizontal movement speed.

Third Embodiment

Next, a third embodiment of the invention will be described.

Figure 10:
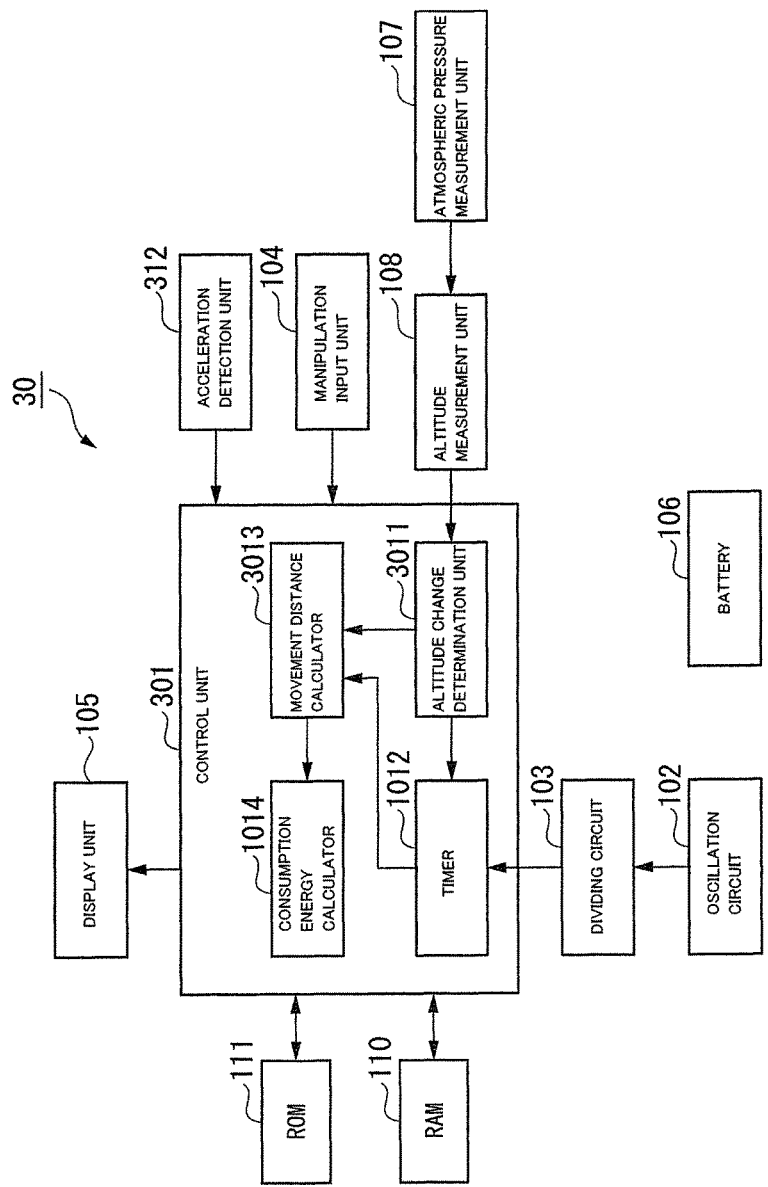
FIG. 10 is a block diagram illustrating a configuration of an electronic device according to a third embodiment of the invention.

FIG. 10 is a block diagram illustrating a configuration of an electronic device 30 according to the present embodiment.

The electronic device 30 includes an acceleration detection unit 312 in addition to the configuration of the electronic device 10 in the first embodiment shown in FIG. 2, and includes a control unit 301 instead of the control unit 101. Since other configurations of the electronic device 30 are the same as the configurations of the electronic device 10 in the first embodiment, the description will not be repeated.

The acceleration detection unit 312 is an acceleration sensor that detects acceleration, and outputs an acceleration signal indicating the detected acceleration to the control unit 301.

The control unit 301 includes an altitude change determination unit 3011, the timer 1012, a movement distance calculator 3013, and the consumed energy calculator 1014. If the time when the altitude change state is the horizontal movement state exceeds the predetermined time T, the altitude change determination unit 3011 determines whether the altitude change state is the resting state based on the detected acceleration (for example, a walking state where the user is walking). Specifically, first, the altitude change determination unit 3011 extracts a component of a predetermined frequency band (for example, 0.4 Hz to 4 Hz) from acceleration signals input from the acceleration detection unit 312. This frequency band includes a realistic frequency range as acceleration on account of a person's walking speed, and does not include an unrealistic range. Further, if the intensity of the extracted component is lower than a predetermined intensity threshold value, the altitude change determination unit 3011 determines that the altitude change state is the resting state, and if the intensity of the extracted component is equal to or higher than the intensity threshold value, the altitude change determination unit 3011 determines that the altitude change state is not the resting state. Thus, the determination accuracy of the resting state can be enhanced. If the acceleration sensor is to be driven only when the time in the horizontal movement state exceeds the predetermined time T, power consumption can be reduced compared with the case where the acceleration sensor is constantly driven. Since other functions of the altitude change determination unit 3011 are the same as the functions of the altitude change determination unit 1011 in the first embodiment, the description will not be repeated.

The movement distance calculator 3013 counts the number of steps in each altitude change state based on the cycle of the component extracted from the acceleration signal input from the acceleration detection unit 312, and multiplies the number of steps in each altitude change state by the walking stride in each altitude change state stored in the RAM 110, respectively, to calculate the movement distance in each altitude change state. Since the functions of the timer 1012 and the consumed energy calculator 1014 are the same as in the first embodiment, the description will not be repeated.

The RAM 110 stores the walking stride in each altitude change state (walking stride in the ascending state, walking stride in the horizontal movement state, and walking stride in the descending state), instead of the movement speed in each altitude change state. The walking stride is a type of unit information relating to the movement. The walking stride may be variably set based on the manipulation signal from the manipulation input unit 104.

As described above, the electronic device 30 according to the present embodiment includes the acceleration detection unit 312, and determines whether the altitude change state is the horizontal movement state or the resting state based on the acceleration signal detected by the acceleration detection unit 312. Thus, it is possible to determine whether the altitude change state is the horizontal movement state or the resting state with high accuracy. Further, the electronic device 30 counts the number of steps in each altitude change state based on the acceleration signal detected by the acceleration detection unit 312, and multiplies the number of steps in each altitude change state by the walking stride in each altitude change state that is stored in advance, respectively, to calculate the movement distance in each altitude change state. Thus, the movement distance in each altitude change state can be calculated with high accuracy.

All or some of the entire functions of the respective units provided in the electronic devices 10, 20, and 30 in the above-described embodiments may be realized by recording a program for realizing the functions in a computer-readable recording medium, and allowing a computer system to read the program recorded in the recording medium. Here, the "computer system" includes an operating system (OS) and hardware such as peripheral devices.

Further, the "computer-readable recording medium" refers to a portable medium such as a flexible disk, a magneto-optical disk, a ROM or a CD-ROM, and a storage unit such as a hard disk built in the computer system. Furthermore, the "computer-readable recording medium" may include a medium that dynamically retains the program for a short time, such as a communication line that transmits the program through a network such as the Internet or a communication cable such as a telephone cable, and a medium that retains the program for a certain period of time, such as a volatile memory inside the computer system in this case. In addition, the program may be a program for realizing some of the above-mentioned functions, or may be a program capable of realizing the above-mentioned functions by combination with a program that is recorded in the computer system in advance.

Hereinbefore, the exemplary embodiments of the invention are described, but the invention is not limited thereto, and may include various modifications in a range without departing from the spirit of the invention.

For example, in the above-described embodiments, the altitude change determination units 1011 and 3011 distinguishingly determine the ascending state and the descending state, but may collectively determine the ascending state and the descending state as an elevating state. In this case, the timer 1012 measures the elapsed time with respect to the integrated elevating state. Further, the movement distance calculators 1013 and 3013 calculate the movement distance with respect to the integrated elevating state. In addition, the RAM 110 stores the movement speed with respect to the integrated elevating state and the weighting factor used for calculation of the consumed energy with respect to the integrated elevating state.

Further, in the above-described embodiment, the altitude change determination units 1011 and 3011 distinguishingly determine the non-walking state and the resting state, but may collectively determine the non-walking state and the resting state as a resting state. In this case, the timer 1012 measures the elapsed time with respect to the integrated resting state.

In addition, if a predetermined time (for example, two hours) elapses after the operation in the altitude log mode is started, the electronic devices 10, 20, and 30 may change the movement speed (the ascending movement speed, the descending movement speed, and the horizontal movement speed) for calculating the movement distance to a lower value. In this case, the RAM 110 stores the movement speed until the predetermined time elapses and the movement speed after the predetermined time elapses in each altitude change state. Further, the electronic devices 10, 20, and 30 may change the movement speed to become lower as the elapsed time becomes longer after the operation in the altitude log mode is started. Thus, reduction in the movement speed due to fatigue can be considered.

Further, in the above-described embodiments, the number of the key input means included in the manipulation input unit 104 is four, but the invention is not limited thereto. The number of the key input means may be a predetermined number based on the number of the functions of the electronic device 10, or the like, and for example, may be less than four, or may be greater than four.

Further, in the above-described embodiments, the electronic devices 10, 20, and 30 are the electronic watch with the altitude measurement function, but the invention is not limited thereto. The electronic devices 10, 20, and 30 may be any electronic device as long as it has the altitude measurement function and the timing function, and for example, may be a multi-function mobile phone (so-called smart phone).

What is claimed is:

1. An electronic device comprising:
    a storage unit that stores unit information relating to a movement with respect to each of an elevating state and a horizontal movement state;
    an altitude measurement unit that measures a series of altitudes;
    an altitude change determination unit that determines, based on the measured altitudes, whether the movement is the elevating state or not using a first determination section having a first altitude range and that determines, based on the measured altitudes, whether the movement is the horizontal movement state or not using a second determination section having a second altitude range smaller than the first altitude; and
    a movement distance calculator that reads from the storage unit the unit information corresponding to the state determined by the altitude change determination unit and that calculates a movement distance based on the read unit information.

2. The electronic device according to claim 1, further comprising:
a timer that measures time,
wherein the storage unit stores a movement speed in the elevating state and a movement speed in the horizontal movement state, and the movement distance calculator reads from the storage unit the movement speed corresponding to the state determined by the altitude change determination unit and calculates the movement distance based on the read movement speed and the time measured by the timer.

3. The electronic device according to claim 2, further comprising:
a manipulation input unit that receives a manipulation input; and
a setting unit that sets the unit information in the storage unit based on the manipulation input received by the manipulation input unit.

4. The electronic device according to claim 1, wherein when it is determined that the horizontal movement state is continued for a predetermined time, the altitude change determination unit determines that the state is a non-movement state where the movement is not performed.

5. The electronic device according to claim 4, wherein when the altitude change determination unit determines that the state is the non-movement state, the movement distance calculator subtracts the movement distance according to the predetermined time to calculate the movement distance.

6. The electronic device according to claim 5, further comprising:
a manipulation input unit that receives a manipulation input; and
a setting unit that sets the predetermined time in the storage unit based on the manipulation input received by the manipulation input unit.

7. The electronic device according to claim 4, further comprising:
a manipulation input unit that receives a manipulation input; and
a setting unit that sets the predetermined time in the storage unit based on the manipulation input received by the manipulation input unit.

8. The electronic device according to claim 1, further comprising:
a manipulation input unit that receives a manipulation input; and
a setting unit that sets the unit information in the storage unit based on the manipulation input received by the manipulation input unit.

9. A measurement data processing method in an electronic device, comprising:
receiving a series of altitudes measured by an altitude measurement unit;
determining whether a movement is an elevating state or not using a first altitude range based on altitudes within the received series of altitudes;
determining whether the movement is a horizontal movement state or not using a second altitude range smaller than the first altitude range based on altitudes within the received series of altitudes;
reading, from a storage unit that stores unit information relating to the movement with respect to each of the elevating state and the horizontal movement state, the unit information corresponding to the determined state; and
calculating a movement distance based on the read unit information.

10. The method of claim 9, wherein the storage unit stores a movement speed in the elevating state and a movement speed in the horizontal movement state, and further comprising reading from the storage unit the movement speed corresponding to the determined state and calculating the movement distance based on the read movement speed and a time measured by a timer.

11. The method of claim 9, further comprising determining that the state is a non-movement state where the movement is not performed when it is determined that the horizontal movement state is continued for a predetermined time.

12. The method of claim 11, further comprising subtracting the movement distance according to the predetermined time to calculate the movement distance when it is determined that the state is the non-movement state.

13. A non-transitory computer-readable medium containing a measurement data processing program stored therein for causing a computer processor of an electronic device to execute a procedure comprising:
receiving a series of altitudes measured by an altitude measurement unit;
determining whether a movement is an elevating state or not using a first altitude range based on altitudes within the received series of altitudes;
determining whether the movement is a horizontal movement state or not using a second altitude range smaller than the first altitude range based on altitudes within the received series of altitudes;
reading, from a storage unit that stores unit information relating to the movement with respect to each of the elevating state and the horizontal movement state, the unit information corresponding to the determined state; and
calculating a movement distance based on the read unit information.

14. The non-transitory computer-readable medium of claim 13, wherein the storage unit stores a movement speed in the elevating state and a movement speed in the horizontal movement state, and further comprising reading from the storage unit the movement speed corresponding to the determined state and calculating the movement distance based on the read movement speed and a time measured by a timer.

15. The non-transitory computer-readable medium of claim 13, further comprising determining that the state is a non-movement state where the movement is not performed when it is determined that the horizontal movement state is continued for a predetermined time.

16. The non-transitory computer-readable medium of claim 15, further comprising subtracting the movement distance according to the predetermined time to calculate the movement distance when it is determined that the state is the non-movement state.

* * * * *